United States Patent
Ohmi et al.

(10) Patent No.: US 6,450,190 B2
(45) Date of Patent: Sep. 17, 2002

(54) METHOD OF DETECTING ABNORMALITIES IN FLOW RATE IN PRESSURE-TYPE FLOW CONTROLLER

(75) Inventors: Tadahiro Ohmi, 1-17-301, Komegahukuro 2-chome, Aoba-ku, Sendai-shi, Miyagi 980-0813 (JP); Seiichi Iida, Kobe (JP); Satoshi Kagatsume, Nirasaki (JP); Jun Hirose, Nirasaki (JP); Kazuo Fukasawa, Nirasaki (JP); Hiroshi Koizumi, Nirasaki (JP); Hideki Nagaoka, Nirasaki (JP); Tomio Uno, Osaka (JP); Kouji Nishino, Osaka (JP); Nobukazu Ikeda, Osaka (JP); Ryousuke Dohi, Osaka (JP); Eiji Ideta, Osaka (JP)

(73) Assignees: Tadahiro Ohmi, Sendai (JP); Tokyo Electron Ltd., Tokyo (JP); Fujikin Incorporated, Osaka (JP)

( * ) Notice: Subject to any disclaimer, the term of this patent is extended or adjusted under 35 U.S.C. 154(b) by 0 days.

(21) Appl. No.: 09/826,834

(22) Filed: Apr. 6, 2001

Related U.S. Application Data (63) Continuation of application No. PCT/JP00/05043, filed on Jul. 27, 2000.

(30) Foreign Application Priority Data

Aug. 10, 1999 (JP) .......................................... 11-226023

(51) Int. Cl.$^7$ ............................................... G05D 7/06

(52) U.S. Cl. ....................... 137/14; 137/486; 137/487.5; 137/557; 340/611

(58) Field of Search ........................... 137/12, 14, 486, 137/487.5, 557; 73/1.35; 340/611; 438/935

(56) References Cited

U.S. PATENT DOCUMENTS

| | | | | |
|---|---|---|---|---|
| 5,054,650 A | * | 10/1991 | Price ........................ | 137/487.5 |
| 5,129,418 A | * | 7/1992 | Shimomura et al. ........ | 137/486 |
| 6,302,130 B1 | * | 7/2000 | Ohmi et al. .................. | 137/14 |

FOREIGN PATENT DOCUMENTS

| JP | 8-338546 A | 12/1996 |
|---|---|---|
| WO | WO-00/11531 A1 | 3/2000 |

\* cited by examiner

*Primary Examiner*—Michael Powell Buiz
*Assistant Examiner*—Ramesh Krishnamurthy
(74) *Attorney, Agent, or Firm*—Griffin & Szipl, P.C.

(57) ABSTRACT

A method of detecting abnormalities in flow rate in pressure-type flow controller. The method checks the flow rate for abnormalities while controlling the flow rate of fluid in a pressure-type flow controller FCS using an orifice—the pressure-type flow controller wherein with the upstream pressure $P_1$ maintained about two or more times higher than the downstream pressure $P_2$, the downstream flow rate $Q_C$ is calculated by the equation $Q_C = KP_1$ (K: constant) and wherein the control valve CV is controlled on the basis of the difference signal $Q_Y$ between the calculated flow rate $Q_C$ and the set flow rate $Q_S$.

5 Claims, 7 Drawing Sheets

METHOD OF DETECTING ABNORMALITIES IN FLOW RATE IN PRESSURE-TYPE FLOW CONTROLLER

This application is a continuation of international application number PCT/JP00/05043, filed Jul. 27, 2000.

FIELD OF THE INVENTION

The present invention relates to a pressure-type flow controller for a variety of fluids, like gases used in the manufacturing of semiconductors, chemical products, chemicals and precision machine parts. More specifically, this invention relates to a method of detecting abnormalities in flow rate when an orifice is clogged in the pressure-type flow controller.

BACKGROUND OF THE INVENTION

Hitherto, the flow rate has been controlled mostly by a mass flow controller in fluid supply apparatuses in semiconductor manufacturing and chemicals manufacturing facilities, especially where a high precision flow rate control is required.

However, the mass flow controller has the following shortcomings:
(1) relatively slow response in case the sensor is of a thermal type, (2) poor control precision in a low flow rate range and product-to-product lack of uniformity, (3) trouble-proneness in operation, that is, low reliability, (4) high costs of the product and replacement parts which boost running costs.

After intensive research, the inventors have developed a pressure-type flow controller using an orifice as disclosed in Japanese Laid-open Patent Application No. 8-338546.

The principle of this pressure-type flow controller is the following. If the ratio $P_2/P_1$ of the gas pressure on the upstream side of the orifice $P_2$ to that on the downstream side of the orifice $P_1$ is below the critical pressure of the gas (in the case of air, nitrogen etc., about 0.5), the flow velocity of the gas passing through the orifice reaches a sonic velocity so that changes in the pressure on the downstream side of the orifice will not be felt on the upstream side any more, which permits a stable mass flow rate corresponding to the state on the upstream side of the orifice.

If the orifice diameter is fixed or constant and the pressure P1 on the upstream side is set at twice or more as high as the pressure P2 on the downstream side, the gas flow rate $Q_C$ on the down stream side of the orifice depends on only the pressure $P_1$ on the upstream side. That is, a linear relation given by equation $Q_C = KP_1$ (K is a constant) holds with a high degree of precision. Moreover, if orifices have the same diameter, then they are also identical in constant K.

This pressure-type flow controller has an advantage that the flow rate on the downstream side can be controlled with high precision by detecting the pressure P1 on the upstream side only.

However, a problem is that the small size bore of the orifice can clog. The orifice bore is in the order of microns, and it can happen that the orifice bore gets clogged by dust or the like, which renders the orifice uncontrollable.

The piping in which the flow rate is controlled has to be highly clean inside, but sawdust and other foreign matter can creep in during the piping work. If the orifice is clogged, the flow rate can not be controlled, which puts the whole plant in an unstable state and can produce a large number of defective products.

With some gases, the chemical reaction becomes uncontrollable and could cause an explosion. To prevent the clogging, it might be suggested that a gasket filter should be placed within the piping. But that could have an adverse effect on the conductance of the piping.

As a solution to the problem, the inventors disclosed a method of detecting the clogging in unexamined Japanese patent application No. 10-236653. In this method, an alarm is activated when the clogging of the orifice reaches a specific level.

Figure 8:
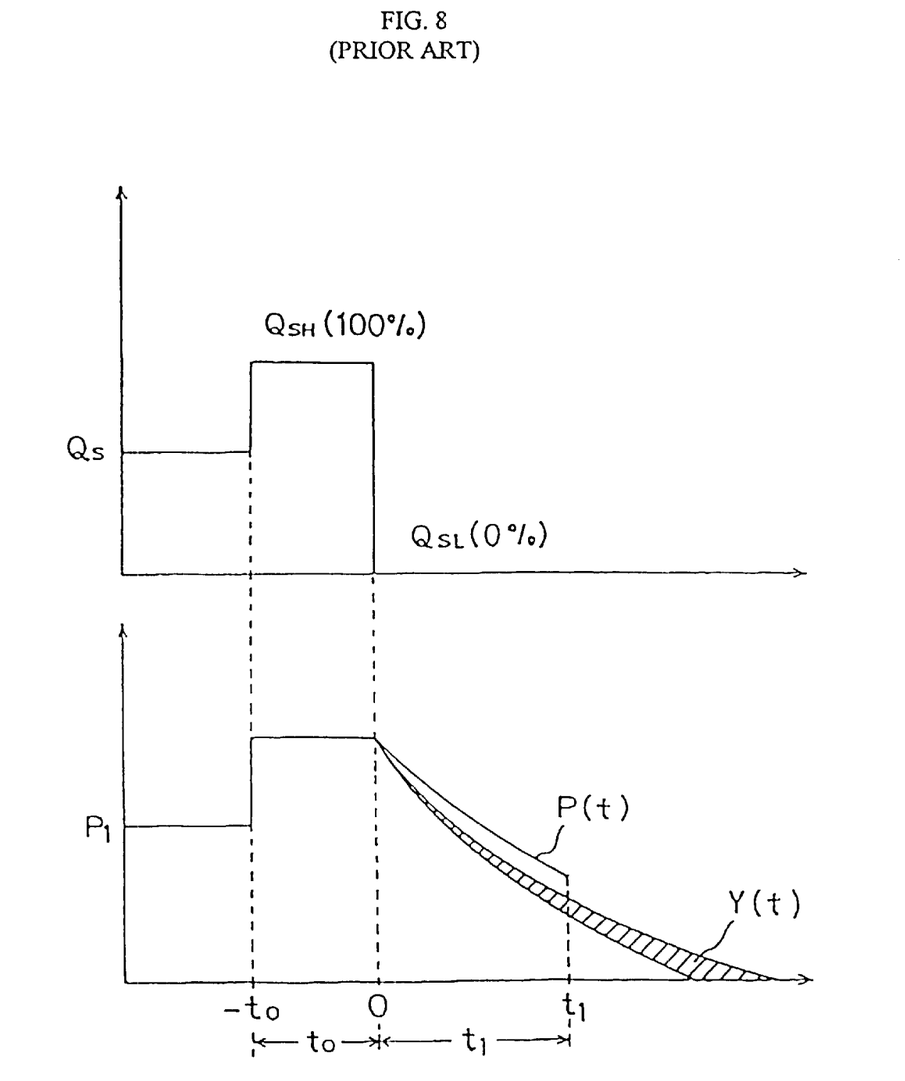
FIG. 8 is a signal waveform in the flow rate abnormality detection mode previously adopted by the present inventors.

The aforesaid invention comprises, as shown in FIG. 8, a first step of holding a set flow rate $Q_S$ at a high set flow rate $Q_{SH}$ (usually 100%), a second step of obtaining pressure attenuation data P(t) by switching from the high set flow rate $Q_{SH}$ to a low set flow rate $Q_{SL}$ (usually, 0%) to measure the pressure $P_1$ on the upstream side, a third step of checking the aforesaid attenuation data P(t) against reference pressure attenuation data Y(t) measured under the same conditions with the orifice not clogged, and a fourth step of setting off an alarm when the pressure attenuation data P(t) differ from the reference pressure attenuation data Y(t) by a specific quantity. That is, in case P(t) is out of Y(t) within a certain range, an alarm for the clogging will be activated.

The aforesaid method offers an advantage that the alarm for the clogging can be automated, but has the following shortcomings.

First, the flow rate abnormality detection mode (clogging detection mode) is started after the flow control mode is shut off, and therefore the flow rate can not be controlled during the flow rate abnormality detection mode.

Another problem is that since the low set flow rate $Q_{SL}$ is set at 0%, for example, time is needed for exhausting. That is, it takes long to make a judgment. Therefore, the detection of a flow rate abnormality is generally carried out in a final stage after the flow rate control is completed. As a result, it is impossible to know, in the actual controlling of the flow rate, whether the orifice has been clogged.

SUMMARY OF THE INVENTION

The present invention sets out to solve those problems. In accordance with the present invention, in a pressure-type flow controller having a control valve, an orifice, a pressure detector detecting the pressure on an upstream side between the control valve and the orifice, and a flow rate setting circuit, wherein the upstream pressure $P_1$ is maintained about two or more times higher than the downstream pressure $P_2$, the downstream flow rate $Q_C$ is calculated by the equation $Q_C = KP_1$ (K: constant), and wherein the control valve is controlled on the basis of the difference signal $Q_Y$ between the calculated flow rate $Q_C$ and the set flow rate $Q_S$, there is provided a method according to the present invention of detecting the clogging of the orifice in the pressure-type flow controller. The method of the invention comprises, with a testing circuit provided separately and with the flow control of the control valve placed in a shut off state, outputting a testing signal $\Delta Q_S$ having a testing amplitude $V_O$ from a testing circuit to the control valve, measuring a pressure amplitude V of a variable pressure $\Delta P_1$ of the pressure $P_1$ on the upstream side that arises in response to opening and closing adjustment of the control valve and setting off an alarm for the clogging of the orifice when the pressure amplitude V is smaller than a limit amplitude Vt.

The present invention provides a second method of detecting flow rate abnormality which comprises, without a testing circuit separately provided, outputting a testing signal $\Delta Q_S$ having a testing amplitude $V_O$ from a flow rate setting circuit 32, measuring the pressure amplitude V of variable pressure $\Delta P_1$ of the pressure $P_1$ on the upstream side that arises in response to the outputting, and setting off an alarm for the clogging of the orifice when the pressure amplitude V is smaller than the limit amplitude Vt.

The present invention also provides a method of detecting a flow rate abnormality, comprising: outputting a testing signal $\Delta Q_S$ to a control valve CV with the testing signal $\Delta Q_S$ superimposed on a signal representing a steady-state set flow rate $Q_{SO}$.

The present invention furthermore provides a method of detecting a flow rate abnormality wherein the testing signal $\Delta Q_S$ to be outputted to a control valve CV is a sine wave signal.

The present invention also provides a method of detecting a flow rate abnormality wherein a testing signal $\Delta Q_S$ to be outputted to a control valve CV is a pulse signal.

DESCRIPTION OF THE PREFERRED EMBODIMENTS

Hereafter, the embodiments of the present invention will be described with reference to the drawings.

The present invention concerns a method of detecting abnormalities in the flow rate in a pressure-type flow controller. Preconditions under which the pressure-type flow controller works are the same as described in Japanese Laid-open Patent Application No. 8-338546. In other words, when pressure P1 on an upstream side is set at twice or more as high as pressure P2 on a downstream side, the rate $Q_C$ on the down stream side depends on only the pressure $P_1$ on the upstream side and a linear relation $Q_C$=KP1 holds with high precision. If gases are the same and orifices are identical, the proportional constant K is fixed. If a different orifice bore is used with the same kind of gas, constant K should be changed.

Therefore, if a specific fluid is controlled to a fixed set flow rate $Q_S$, a control valve CV is actuated so that the pressure $P_1$ on the upstream side is $P_1$=$Q_S$/K. That is, while the pressure $P_1$ on the upstream side is measured constantly, the control valve CV is merely adjusted in relation to that.

Embodiment 1

Figure 1:
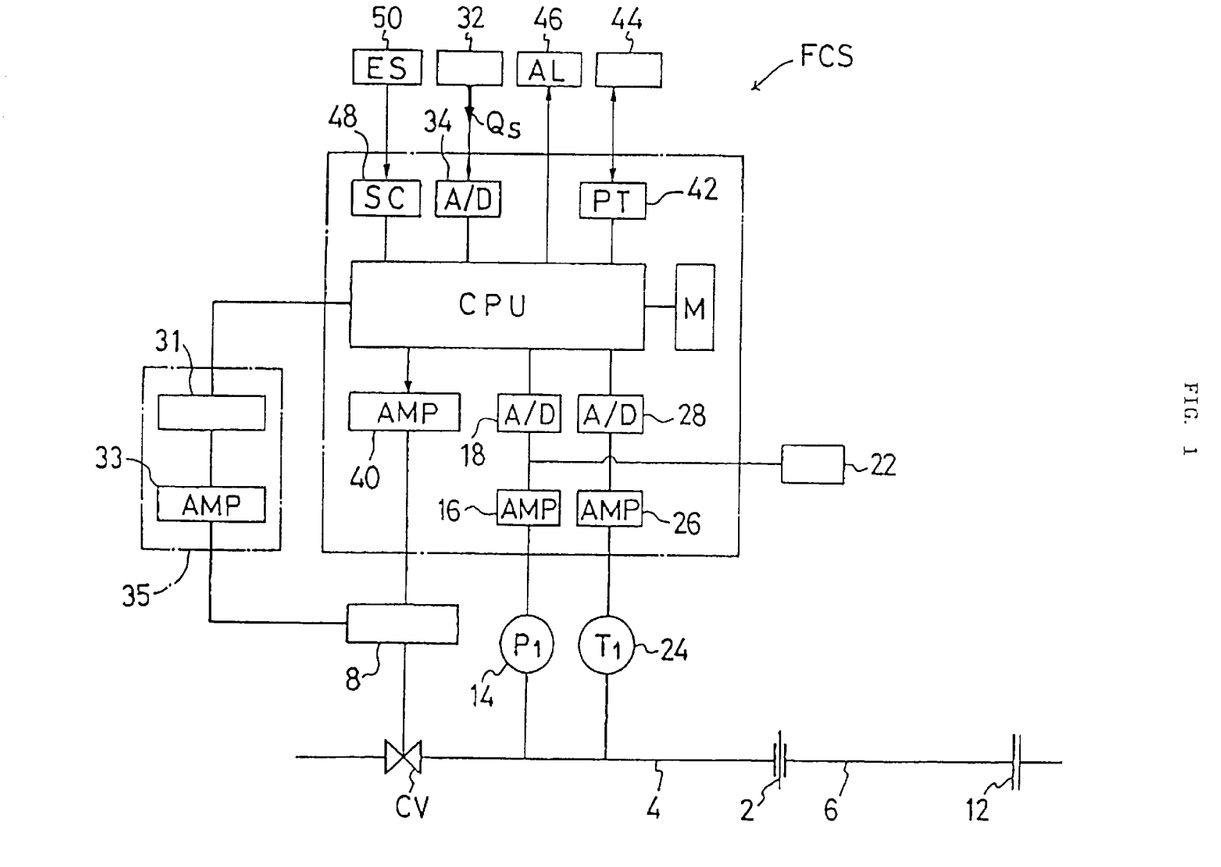
FIG. 1 is a block diagram of a first pressure-type flow control system FCS according to the present invention.

FIG. 1 is a block diagram of a first pressure-type flow control system FCS according to the present invention.

In FIG. 1, a flow passage 4 on the upstream side of an orifice 2 is connected to a control valve CV that is operated by a drive 8. A flow passage 6 on the downstream side is connected to a fluid reaction unit (not shown) via a gas take-out joint 12.

The pressure $P_1$ on the upstream side of the orifice is detected by a pressure detector 14 and displayed on a pressure display 22 via an amplification circuit 16. The output is digitized through an A/D converter 18, and a flow rate Q on the downstream side of the orifice is worked out by the equation Q=$KP_1$ (where K is a constant) in a central processing unit CPU.

Meanwhile, the temperature $T_1$ on the upstream side of the orifice, detected by a temperature detector 24, is inputted to the CPU via an amplification circuit 26 and an A/D converter 28, and the flow rate Q is temperature-compensated and a calculated flow rate $Q_C$ is worked out.

From a flow rate setting circuit 32, a set flow rate $Q_S$ is outputted via an A/D converter 34 and sent to the CPU. In the CPU, the difference signal $Q_Y$ between the signal of the calculated flow rate $Q_C$ and the set flow rate signal $Q_S$ is worked out by the equation $Q_Y$=$Q_C$−$Q_S$, and the difference signal $Q_Y$ is outputted to the drive 8 via an amplification circuit 40. The drive 8 actuates the control valve CV to bring the difference signal $Q_Y$ to zero so that the calculated flow rate $Q_C$ on the downstream side is equal to the set flow rate $Q_S$.

A testing circuit 31, a feature of the present invention, is a testing signal generating circuit which is controlled by the CPU and will be described later, and actuates the drive 8 via an amplification circuit 33.

A clogging detection circuit 35 comprises the testing circuit 31 and the amplification circuit 33.

In FIG. 1, the reference letter M indicates a memory unit, the reference numeral 42 a communication port PT for communication with the outside, the numeral 44 denotes external circuits like a trigger circuit, the reference numeral 46 an alarm circuit to be activated in case of the orifice getting clogged, the reference numeral 48 a power circuit SC, the reference numeral 50 an external power source for ±15V. The reference letters AMP indicate an amplification circuit and the reference letters A/D an A/D converter.

As for the control valve CV, a so-called direct touch-type metal diaphragm is used. A piezo-electric element is adopted as drive 8 for control valve CV. As an alternative to that, other drive units may be used in the drive 8 for control valve CV. The other drive units include magnetostrictive drive units, solenoid drives, motor drive units, pneumatic pressure drive units and thermal expansion type drive units.

Pressure detector 14 is a semiconductor strictive-type pressure sensor. As an alternative, sensors used as pressure detectors may be metal foil strictive-type sensors, capacitance-type pressure sensors and magneto-resistance sensors.

Temperature detector 24 is a thermocouple-type temperature sensor in this embodiment. Alternatively, other known temperature sensors may be used such as resistance-bulb temperature sensors.

Orifice 2 in this embodiment is an orifice made in a sheet-formed metallic sheet gasket with a bore made by cutting. Alternatively, other known orifices may be used such as an extra fine pipe and orifice made in a metallic film with a bore formed by etching or electric discharge machining.

The pressure-type flow control system using an orifice according to the invention is called an FCS. Using this FCS, the inventor has studied abnormalities occurring when the orifice is clogged.

When the clogging detection circuit 35 to detect an abnormality in flow rate is not working, a steady-state set flow rate $Q_{SO}$ is outputted from the flow rate setting circuit 32 so that the control valve CV is controlled and adjusted to a specific degree of opening by the drive 8. Thus, the pressure $P_1$ on the upstream side is set at a steady-state pressure $P_{10}$.

To detect clogging in this state, a clogging detection starting signal is inputted into the CPU from an external circuit 44. With starting signal as trigger signal, the CPU suspends the outputting of control signals to the amplification circuit 40. The CPU immediately outputs signals to the testing circuit 31. From the testing circuit 31, a set flow rate signal $Q_S(t)$ made up of the steady-state set flow rate $Q_{SO}$ and a testing signal $\Delta Q_S$ is outputted according to the formula: $Q_S(t)=Q_{SO}+\Delta Q_S$.

The set flow rate signal $Q_S(t)$ controls the drive 8 via the amplification circuit 33 to the operate control valve CV. In other words, while the FCS is not working, clogging of the orifice is checked with the testing signal $\Delta Q_S$ by the testing circuit 31 with the orifice passing flow rate maintained at the steady-state set flow rate $Q_{SO}$. The detection of clogging according to the present invention is finished in a short time, and therefore flow rate control is guaranteed by the steady-state set flow rate signal $Q_{SO}$ during the time for the detection of clogging. If the orifice is not clogged, the operation immediately returns to the FCS control mode, and the procedure for detection of clogging does not affect the flow rate control.

Figure 2:
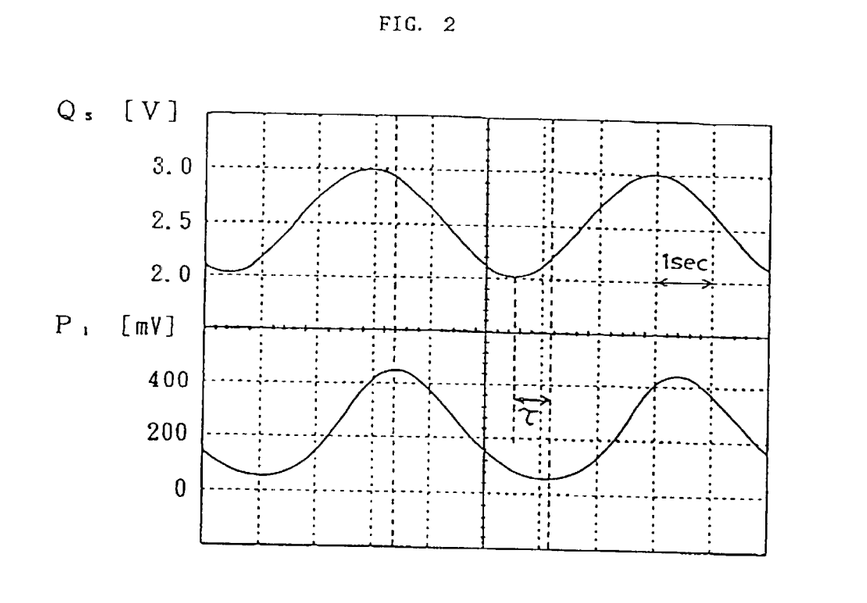
FIG. 2 shows signal waveforms of the set flow rate $Q_S$ and pressure P1 on the upstream side when the orifice is not clogged.

FIG. 2 shows signal waveforms of the set flow rate $Q_S(t)$ and pressure $P_1(t)$ on the upstream side when the orifice is not clogged. As mentioned above, the set flow rate signal $Q_S(t)$ from the testing circuit 31, which is made up of the steady-state set flow rate signal $Q_{SO}$ and the testing signal $\Delta Q_S$, follows the formula: $Q_S(t)=Q_{SO}+\Delta Q_S$.

The steady-state set flow rate signal $Q_{SO}$ is a direct current of 2.5 volts. The testing signal $\Delta Q_S$ is a sine wave signal with an amplitude of 0.5 volts and a frequency of 0.2 Hz. That is, the set flow rate $Q_S$ is given as $Q_S=2.5+0.5$ sine ($\omega$t) in terms of volts. The gas used was $N_2$ gas and the temperature of the gas was 21° C. The unclogged orifice that was tested was 68 $\mu$m in bore diameter. The value of the steady-state set flow rate $Q_{SO}$ was 69.2 sccm.

In this case, too, the pressure $P_1(t)$ on the upstream side is given as a synthesis of the steady-state pressure $P_{10}$ and the variable pressure $\Delta P_1$, that is, $P_1(t)=P_{10}+\Delta P_1$. The steady-state pressure $P_{10}$ is a component controlled to the steady-state value, and the variable pressure $\Delta P_1$ is a response waveform for the testing signal $\Delta Q_S$. The variable pressure $\Delta P_1$ is a strained sine waveform. If $P_1$ is approximated by the sine wave signal, $P_{10}=250$ mV, and $\Delta P_1=200$ sin($\omega$t) mV, then, $P_1$ follows the formula: $P_1=250+200$ sin ($\omega$t).

Figure 3:
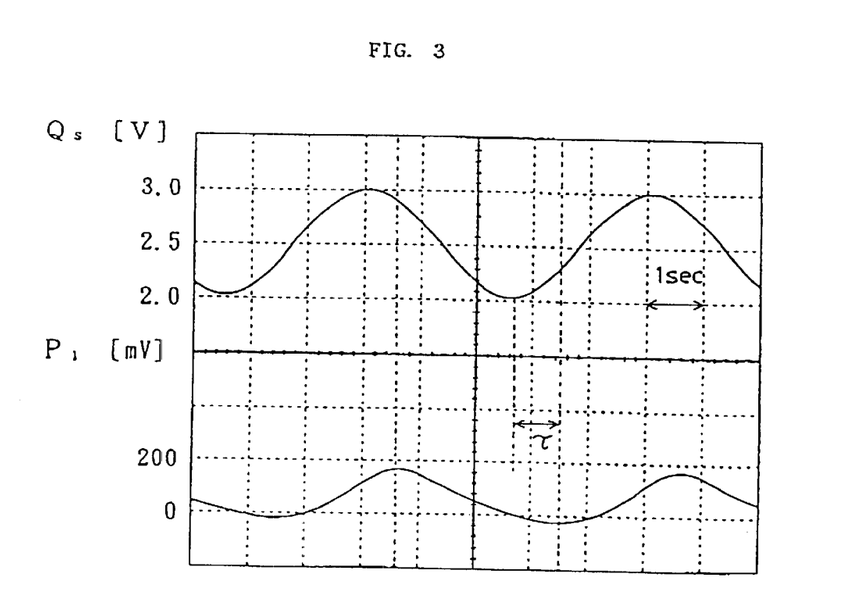
FIG. 3 shows signal waveforms of the set flow rate $Q_S$ and pressure P1 on the upstream side when the orifice is clogged.

FIG. 3 shows signal waveforms of the set flow rate signal $Q_S(t)$ and pressure $P_1(t)$ on the upstream side when the orifice is clogged. The diameter of the orifice used is 62 $\mu$m. It is presupposed that the orifice is about 10% clogged as compared with that in FIG. 2. When the same set flow rate signal $Q_S(t)=2.5+0.5$ sin($\omega$t) as in FIG. 2 is given, the pressure $P_1(t)$ on the upstream side will clearly differ. That is, the pressure $P_1$ on the upstream side will be $P_1=70+90$ sin($\omega$t). The actual steady-state set flow rate was 57.2 sccm.

A comparison between FIG. 2 and FIG. 3 shows that the steady-state pressure $P_{10}$ changes from 250 mV to 70 mV and the variable pressure $\Delta P1$ changes from 200 sin($\omega$t) to 90 sin($\omega$t). Since the orifice is clogged, it is unavoidable that the steady-state pressure $P_{10}$ changes more or less.

It is also pointed out that the reason that the pressure $P_1(t)$ on the upstream side is delayed in phase in relation to the testing signal $\Delta Q_S$ is response delay. In the present invention, however, the delay $\tau$ presents no problem. The above-mentioned variable pressure $\Delta P_1$ was obtained in terms of the amplitude. It may also be obtained in terms of a $V_{PP}$, that is, the peak-to-peak value.

The inventors noted that the clogging of the orifice changes the variable pressure $\Delta P_1$ greatly. That is, the fact is that if the variable pressure $\Delta P1$ is expressed in V sin($\omega$t) when the same $\Delta Q_S=0.5$ sin($\omega$t) volts is given as a testing signal, the pressure amplitude V sharply drops from ±200 mV to 90 mV. From this fact, it is possible to detect the clogging of the orifice by the decrease in the pressure amplitude V of the variable pressure such that an alarm for the clogging of the orifice can be set off outside by using alarm signals.

Figure 4:
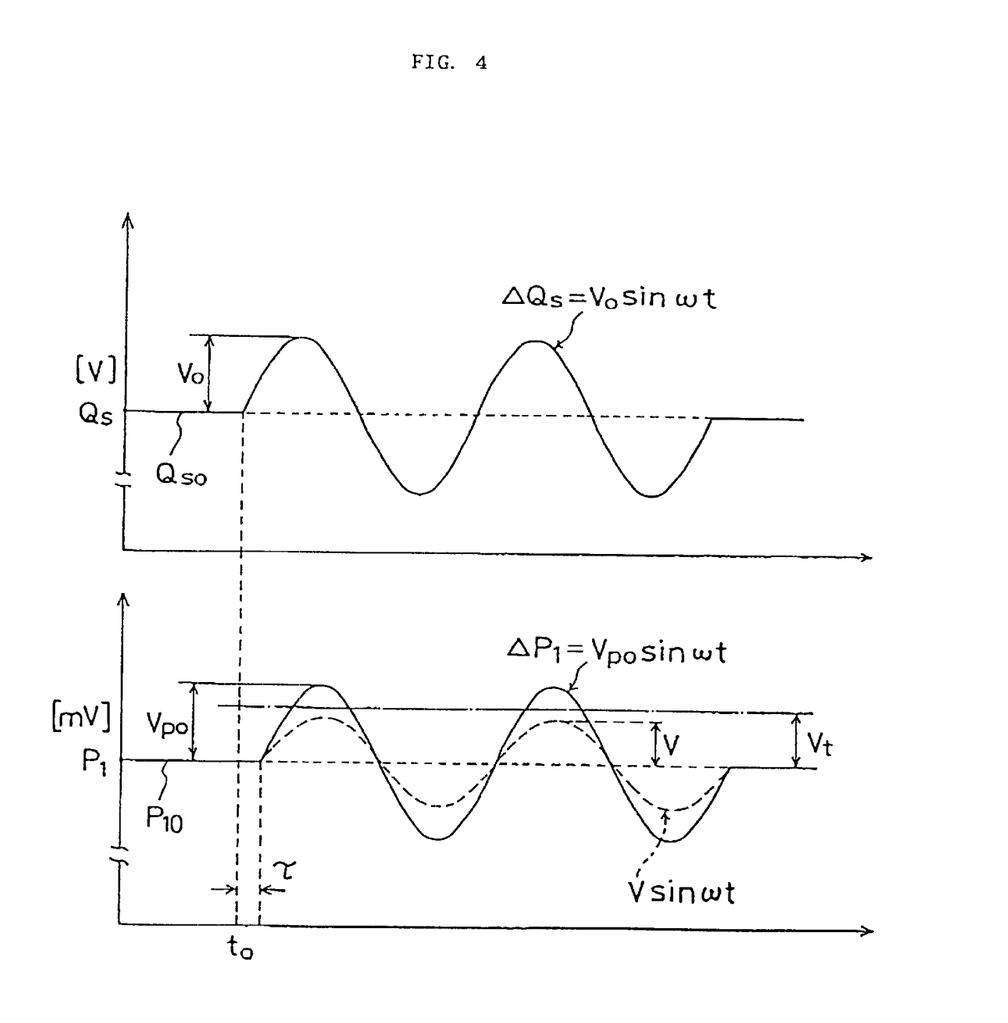
FIG. 4 is a conceptual diagram of signal waveforms according to the present invention.

FIG. 4 is a conceptual diagram of signal waveforms according to the present invention that summarizes the above-mentioned points. When the flow rate is controlled by the steady-state set flow rate signal $Q_{SO}$, the flow rate control by the FCS is interrupted to check the clogging of the orifice. Immediately, the testing signal $\Delta Q_S=V_O$ sin($\omega$t) from the testing circuit is superimposed on the $Q_{SO}$ and outputted.

Then, the response signal, that is, the pressure $P_1(t)$ on the upstream side is measured. The pressure $P_1(t)$ on the upstream side is made up of the steady-state pressure $P_{10}$ and the variable pressure $\Delta P_1=V$ sin($\omega$t). The calculated flow rate $Q_C$ is worked out according to the formula $Q_C=KP_{10}$ from the steady-state pressure $P_{10}$. Meanwhile, if the pressure amplitude V of the variable pressure $\Delta P_1$ is smaller than the limit amplitude $V_t$, it is taken as an indication of clogging of the orifice and an alarm signal is outputted to an alarm circuit 46 from the CPU.

It is so arranged that when the orifice is not clogged, the variable pressure $\Delta P_1$ is expressed in $\Delta P_1=V_{PO}$ sin($\omega$t). Therefore, it is judged that no clogging is caused when $V_t<V\leq V_{PO}$. If $V<V_t$, it is judged that the orifice is clogged, an alarm signal will be outputted.

There is more or less arbitrariness in setting a limit amplitude $V_t$. That depends on the testing amplitude $V_O$ in the testing signal $\Delta Q_S=V_O$ sin($\omega$t) and also the degree of clogging. In case of a specific testing signal $\Delta Q_S=V$ sin($\omega$t), therefore, the limit amplitude $V_t$ is set on the basis of empirical values.

Embodiment 2

Figure 5:
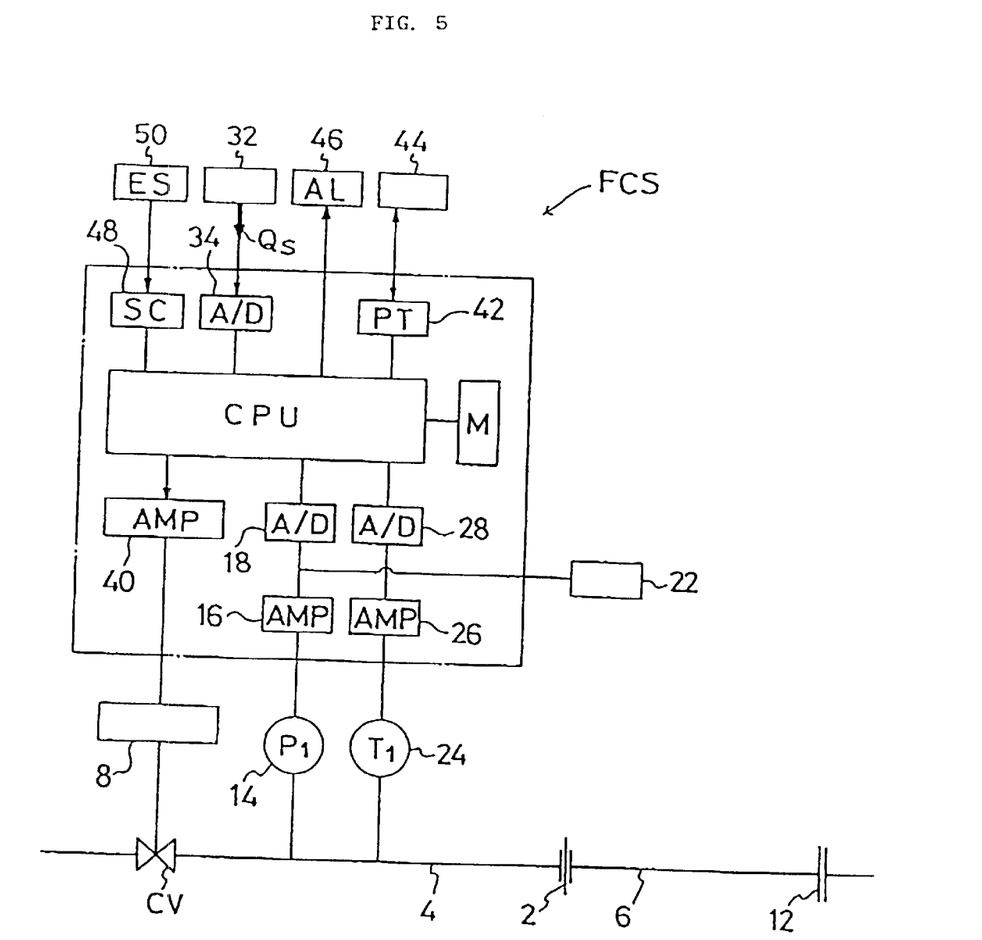
FIG. 5 is a block diagram of a second pressure-type flow control system FCS according to the present invention.

FIG. 5 is a block diagram of a pressure-type flow control system where the clogging is detected with no clogging detection circuit provided. In the flow rate control mode, a steady-state set flow rate signal $Q_{SO}$ is outputted from a flow rate setting circuit 32, and the opening or closing adjustment of a control valve CV is controlled by a CPU and the pressure $P_1$ on the upstream side is controlled to a steady-state pressure $P_{10}$.

If the process in this state is shifted to a clogging detection mode, a set flow rate signal $Q_S(t)=Q_{SO}+V_O$ sin($\omega$t) is outputted to the CPU from the flow rate setting circuit 32. The CPU controls the opening and closing adjustment of the control valve CV via an amplification circuit 40. The pressure $P_1(t)$ on the upstream side shows $P_1(t)=P_{10}+V$ sin(($\omega$t). With this pressure amplitude V, the clogging is detected in the same way as mentioned above.

In other words, the detection of clogging in FIG. 1 is done with a testing circuit 31 provided separately from the FCS. In FIG. 5, the clogging is detected in the FCS alone. In the former, the FCS control is temporarily interrupted in the clogging detection mode. In the latter, the FCS control is exercised simultaneously. In the former, however, because steady-state signals are outputted from the testing circuit, a short time interruption of FCS control has little effect on flow rate control.

Figure 6:
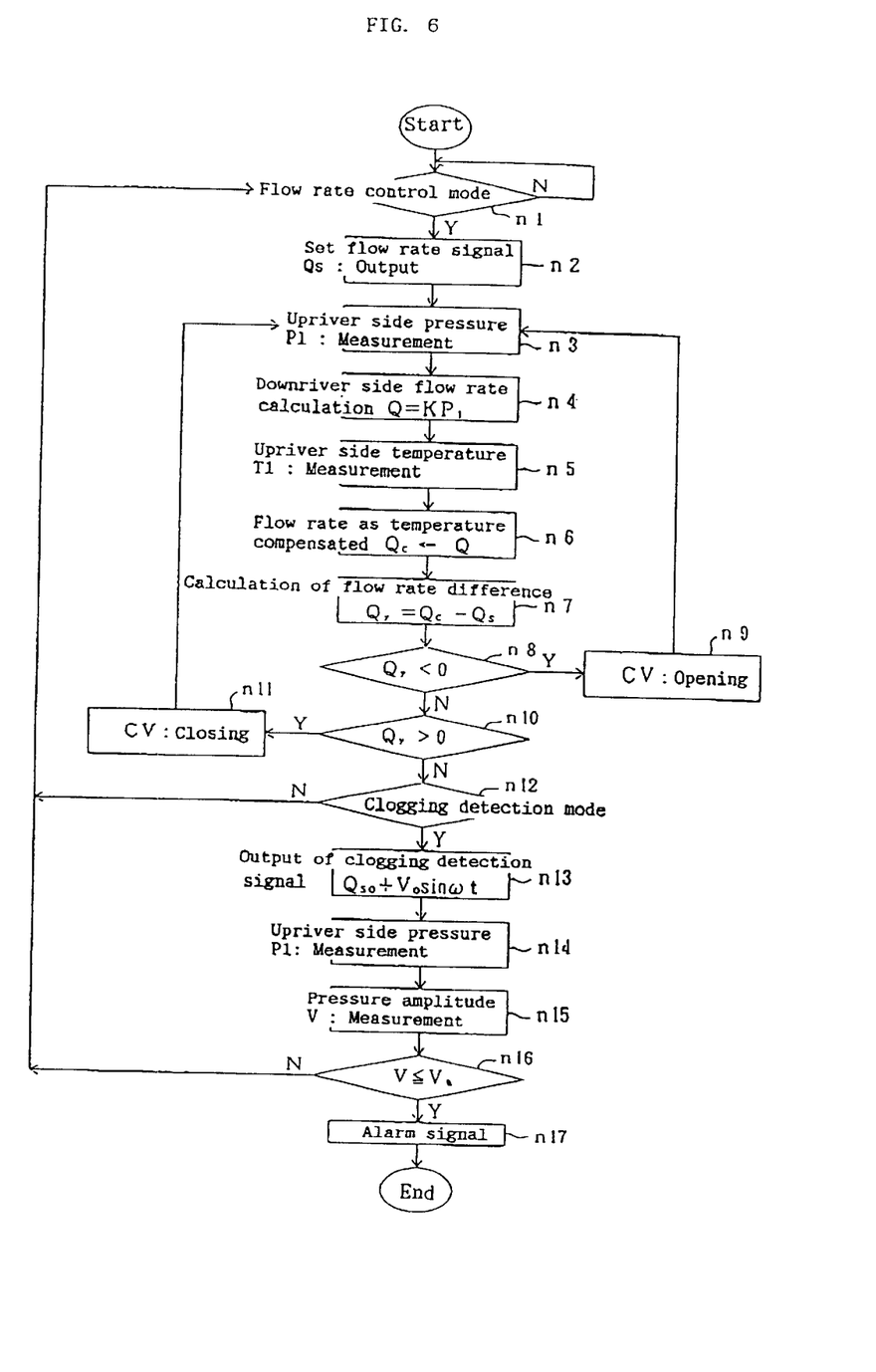
FIG. 6 is a flow chart example for detecting flow rate abnormality owing to the clogging of the orifice.

FIG. 6 is a flow chart example for detecting a flow rate abnormality owing to the clogging of the orifice. This flow chart is applicable to the two apparatuses in FIG. 1 and FIG. 5.

If it is confirmed in Step n1 that the FCS is in the flow rate control mode, the steady-state set flow rate signal $Q_{SO}$ is outputted from the flow rate setting circuit 32 as the set flow rate signal $Q_S$ (n2). If the pressure $P_1$ on the upstream side is measured (n3), the flow rate Q on the downstream side is worked out by the equation $Q=KP_1$ (n4).

Also, the temperature $T_1$ on the upstream side is measured (n5), and the flow rate Q on the downstream side is temperature-compensated to the calculated flow $Q_C$ (n6).

The difference signal $Q_Y$ between the calculated flow rate $Q_C$ and the set flow rate $Q_S$ is worked out by the equation $Q_Y=Q_C-Q_S$ (n7). If $Q_Y$ is negative (n8), the opening of the control valve CV is increased slightly (n9). If $Q_Y$ is positive (n10), the opening of the control valve CV is slightly decreased (n11). And the process returns to Step n3 again. With this process repeated, the valve is so controlled as to bring the calculated flow rate $Q_C$ to the set flow rate $Q_S$. Thus, the flow rate of the gas passing through the orifice is controlled to the initial steady-state set flow rate $Q_{SO}$.

If the mode for detection of the clogging of the orifice is set (n12), the set flow rate signal $Q_S=Q_{SO}+V_O \sin(\omega t)$ including testing signal $\Delta Q_S=V_O \sin(\omega t)$ is outputted (n13). In FIG. 1, that is outputted from the testing circuit 31 and in FIG. 5, that is outputted from the flow rate setting circuit 32. Because the steady-state set flow rate signal $Q_{SO}$ is superimposed, the clogging detection procedure can be done while the flow rate is controlled.

The pressure $P_1$ on the upstream side is detected as $P_1(t)=P_{10}+V \sin(\omega t)$ (n14). The steady-state pressure $P_{10}$ is for the flow rate control, and the pressure amplitude V is calculated from the variable pressure $\Delta P_1=V \sin(\omega t)$ (n15). In case the pressure amplitude V is larger than the limit amplitude $V_t$ (n16), it is judged that there is no clogging, and the process returns to Step n1. In case the pressure amplitude V is smaller than the limit amplitude $V_t$ (n16), it is judged the orifice is clogged and an alarm signal is set off (n17).

Figure 7:
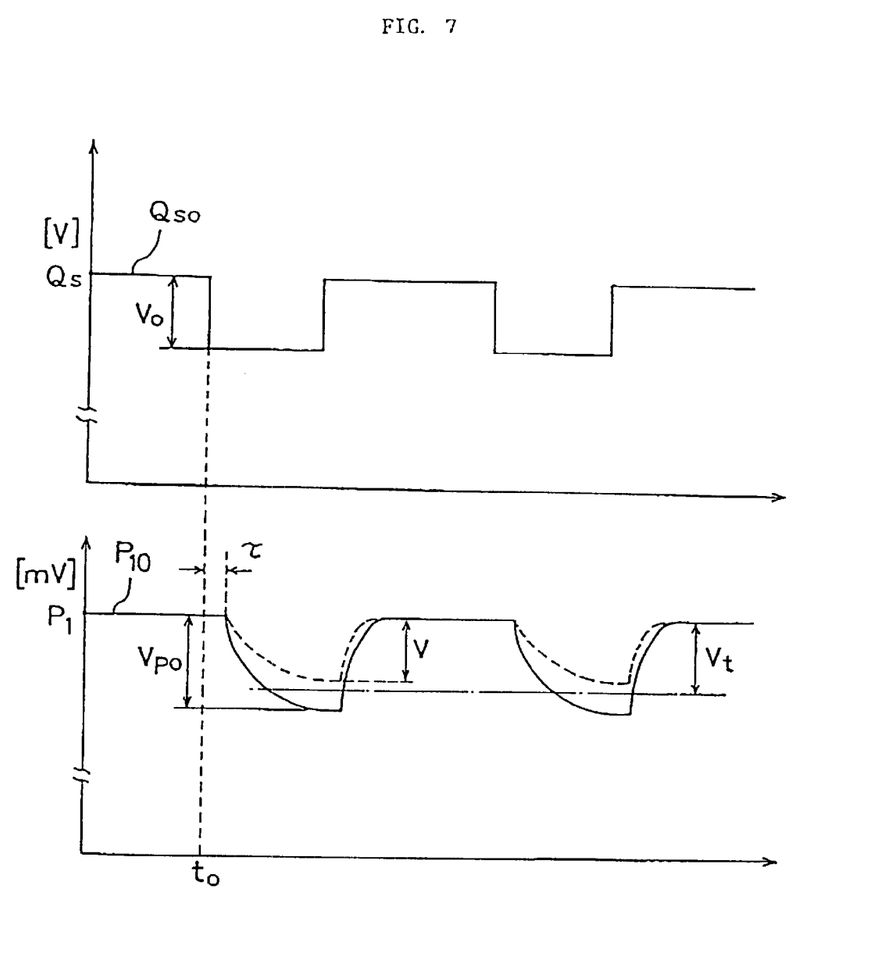
FIG. 7 is a conceptual diagram when the testing signal is a pulse signal.

FIG. 7 is a conceptual diagram when the testing signal is a pulse signal. The depth of the pulse signal is the testing amplitude $V_O$. In response to the signal pressure $P_1(t)$ on the upstream side, too, the variable pressure $\Delta P_1$ is superimposed on the steady-state pressure $P_{10}$. When the depth of this variable pressure $\Delta P_1$, that is, the pressure amplitude V is smaller than the limit amplitude Vt, it is judged that the orifice is clogged. Other details, which are the same as in FIG. 4, will not be described.

The present invention is not limited to the embodiments just described and it is to be understood that changes and variations may be made without departing from the spirit or scope of the present invention.

According to one embodiment of the invention, variable pressure $\Delta P_1$ is taken out from pressure $P_1$ on the upstream side as response to the input from a testing circuit provided separately, and the pressure amplitude V is merely compared with limit amplitude Vt to check for clogging of the orifice. Therefore, abnormalities in the flow rate owing to the clogging of the orifice can be indicated under simple arrangements.

According to another embodiment of the invention, no testing circuit is provided separately, and it is possible to check for the clogging of the orifice using the prior art pressure-type flow controller without modifications. Therefore, abnormalities in flow rate can be detected in quite a simple procedure.

According to a further embodiment the invention, the orifice can be checked for clogging by testing signal $\Delta Q_S$ while controlling the flow rate with steady-state set flow rate signal $Q_{SO}$. That has brought about an epoch-making method in which, while the flow rate is being controlled, abnormalities in flow rate are checked for. In other words, the invention of this embodiment has quite progressive effects as compared with the prior art detection method in which the flow control system is stopped before the abnormality detection mode is started.

It is also noted that abnormalities in the flow rate can be checked for while the flow rate is being controlled, as a result, in case the flow rate drops due to the clogging of the orifice, the flow rate can be so controlled as to be increased by the amount dropped so that the flow rate of the gas passing through the orifice can be maintained at a constant level.

According to a still further embodiment of the invention, sine waveform signals can be used as testing signals and therefore known sine wave electronic technology can be utilized, which can simplify the circuit configuration.

According to a still further embodiment of the invention, pulse signals can be used as testing signals, and therefore known pulse technology can be utilized, which makes it possible to check the flow rate for abnormalities in a simple circuit configuration.

LEGEND OF REFERENCE LETTERS AND NUMERALS

| Reference | Significance |
| --- | --- |
| 2 | orifice |
| 4 | flow passage on the upstream side |
| 8 | drive |
| 12 | gas take-out joint |
| 14 | pressure detector |
| 16 | amplification circuit |
| 18 | A/D converter |
| 22 | pressure display |
| 24 | temperature detector |
| 26 | amplification circuit |
| 28 | A/D converter |
| 31 | detection circuit |
| 32 | flow rate setting circuit |
| 33 | amplification circuit |
| 34 | A/D converter |
| 35 | clogging detection circuit |
| 40 | amplification circuit |
| 42 | communication port |
| 44 | external circuit |
| 46 | alarm circuit |
| 48 | power source circuit |
| 50 | external circuit |
| AMP | amplification circuit |
| A/D | A/D conversion circuit |
| AL | alarm circuit |
| CPU | central processing unit |
| CV | control valve |
| ES | external power source |
| M | memory unit |
| $P_1$ | pressure on the upstream side |
| $P_2$ | pressure on the downstream side |
| $P_{10}$ | steady-state pressure |

-continued

| Reference | Significance |
|---|---|
| $\Delta P_1$ | variable pressure |
| $Q_s$ | set flow rate $Q_s$ |
| $Q_s$ | set flow rate signal $Q_s$ |
| $Q_{so}$ | steady-state set flow rate $Q_{so}$ |
| $Q_{so}$ | steady-state set flow rate signal $Q_{so}$ |
| SC | power circuit SC |

What is claimed is:

1. A method of detecting the clogging of an orifice in a pressure-type flow controller, wherein the controller has a control valve CV, the orifice, a pressure detector to detect a pressure $P_1$ on an upstream side between the control valve CV and the orifice and a flow rate setting circuit, wherein the upstream pressure $P_1$ is maintained about two or more times higher than a downstream pressure $P_2$, a downstream flow rate $Q_C$ is calculated by the equation $Q_C=KP_1$ wherein K is a constant, and wherein the control valve CV is controlled on the basis of a difference signal $Q_Y$ between the calculated flow rate $Q_C$ and a set flow rate $Q_S$, wherein the method comprises the steps of:

providing a separate testing circuit;

maintaining the control valve in a shut off state;

outputting a testing signal $\Delta Q_S$ having testing amplitude $V_O$ from the testing circuit to control valve CV;

measuring a pressure amplitude V of a variable pressure $\Delta P_1$ of the pressure $P_1$ on the upstream side that arises in response to opening or closing adjustment of control valve CV; and setting off an alarm for the clogging of the orifice when the pressure amplitude V is smaller than a limit amplitude Vt.

2. A method of detecting flow rate abnormality in a pressure-type flow controller, wherein the pressure-type flow controller does not have a testing circuit, but has a control valve CV, an orifice, a pressure detector to detect a pressure $P_1$ on an upstream side between the control valve CV and the orifice and a flow rate setting circuit, wherein the upstream pressure $P_1$ is maintained about two or more times higher than a downstream pressure $P_2$, wherein a downstream flow rate $Q_C$ is calculated by the equation $Q_C=KP_1$ wherein K is a constant, and wherein the control valve is controlled on the basis of a difference signal $Q_Y$ between the calculated flow rate $Q_C$ and a set flow rate $Q_S$, wherein said method comprises the steps of:

outputting testing signal $\Delta Q_S$ having testing amplitude $V_O$ from a flow rate setting circuit;

measuring a pressure amplitude V of variable pressure $\Delta P_1$ of pressure $P_1$ on the upstream side arising in response to an opening or closing adjustment of control valve CV; and setting off an alarm for the clogging of the orifice when the pressure amplitude V is smaller than a limit amplitude Vt.

3. A method of detecting flow rate abnormality as defined in either claim 1 or claim 2, further comprising the step of superimposing testing signal $\Delta Q_S$ on a steady-state set flow rate $Q_{SO}$ and outputting a resulting signal to control valve CV.

4. A method of detecting flow rate abnormality as defined in either claim 1 or claim 2 wherein said testing signal $\Delta Q_S$ is a sine wave signal.

5. A method of detecting flow rate abnormality as defined in claim 1 or claim 2 wherein said testing signal $\Delta Q_S$ is a pulse signal.

* * * * *